US012746599B2

(12) United States Patent
Lugo et al.

(10) Patent No.: US 12,746,599 B2
(45) Date of Patent: Sep. 29, 2026

(54) FUNCTIONALLY HOMOGENIZED INTENSITY DISTRIBUTION FOR ADDITIVE MANUFACTURING OR OTHER INDUSTRIAL LASER PROCESSING APPLICATIONS

(71) Applicant: nLIGHT, Inc., Camas, WA (US)

(72) Inventors: Juan Lugo, Vancouver, WA (US); Aaron W. Brown, Vancouver, WA (US); Jay Small, Vancouver, WA (US); Robert J. Martinsen, West Linn, OR (US); Dahv A.V. Kliner, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 1196 days.

(21) Appl. No.: 17/621,886

(22) PCT Filed: Jun. 24, 2020

(86) PCT No.: PCT/US2020/039463
§ 371 (c)(1),
(2) Date: Dec. 22, 2021

(87) PCT Pub. No.: WO2020/264056
PCT Pub. Date: Dec. 30, 2020

(65) Prior Publication Data
US 2022/0241859 A1 Aug. 4, 2022

Related U.S. Application Data

(60) Provisional application No. 62/882,442, filed on Aug. 2, 2019, provisional application No. 62/865,902, filed on Jun. 24, 2019.

(51) Int. Cl.
*B22F 10/20* (2021.01)
*B22F 12/43* (2021.01)
(Continued)

(52) U.S. Cl.
CPC .............. *B22F 10/20* (2021.01); *B22F 12/43* (2021.01); *B23K 26/0734* (2013.01);
(Continued)

(58) Field of Classification Search
CPC ...... B22F 10/20; B22F 12/43; B23K 26/0734; B33Y 10/00; B33Y 30/00; G02B 6/268; H01S 3/005; Y02P 10/25
(Continued)

(56) References Cited

U.S. PATENT DOCUMENTS 6,545,808 B1 4/2003 Ehbets et al.
2006/0013534 A1 1/2006 Bohnert et al.
(Continued)

FOREIGN PATENT DOCUMENTS

CN 1529830 A 9/2004
CN 101617254 A 12/2009
(Continued)

OTHER PUBLICATIONS

Garcia et al., Fast adaptive laser shaping based on multiple laser incoherent combining, Proc. SPIE 10097, High-Power Laser Materials Processing: Applications, Diagnostics, and Systems VI, 1009705 (Feb. 22, 2017); doi: 10.1117/12.2250303 (Year: 2017).*
(Continued)

*Primary Examiner* — Topaz L. Elliott
*Assistant Examiner* — Daniel Ward Hatten
(74) *Attorney, Agent, or Firm* — Wiley Rein LLP

(57) ABSTRACT

Disclosed are techniques for generating a laser output beam having a functionally homogenized intensity distribution. According to some embodiments, a population of few modes in a multi-mode confinement core is excited by application of a low-moded source beam to the multi-mode confinement core, such that the population exhibit an unstable intensity distribution. The unstable intensity distri-
(Continued)

bution is functionally homogenized by providing one or both of modulation of phase displacement in the multi-mode confinement core and variation of launch conditions of the low-moded source beam into the multi-mode confinement core.

18 Claims, 3 Drawing Sheets

(51) Int. Cl.

| | |
|---|---|
| ***B23K 26/073*** | (2006.01) |
| ***B33Y 10/00*** | (2015.01) |
| ***B33Y 30/00*** | (2015.01) |
| ***G02B 6/26*** | (2006.01) |
| ***G02B 27/09*** | (2006.01) |
| ***H01S 3/00*** | (2006.01) |

(52) U.S. Cl.
CPC ............... *B33Y 10/00* (2014.12); *B33Y 30/00* (2014.12); *G02B 27/0927* (2013.01); *G02B 27/0994* (2013.01); *G02B 6/268* (2013.01); *H01S 3/005* (2013.01)

(58) Field of Classification Search
USPC ....................................... 219/121.6; 385/1, 4
See application file for complete search history.

(56) References Cited

U.S. PATENT DOCUMENTS

| | | | | |
|---|---|---|---|---|
| 2006/0278240 | A1* | 12/2006 | Spillman, Jr. ...... | G01D 5/35306 128/898 |
| 2010/0067013 | A1* | 3/2010 | Howieson ................ | G02B 6/14 385/4 |
| 2013/0209112 | A1 | 8/2013 | Witzens | |
| 2018/0088357 | A1 | 3/2018 | Kliner et al. | |
| 2018/0239154 | A1 | 8/2018 | Martinsen et al. | |
| 2019/0011637 | A1* | 1/2019 | Jollivet ................. | H01S 3/0804 |

FOREIGN PATENT DOCUMENTS

| | | | | |
|---|---|---|---|---|
| CN | 102934298 | A | | 2/2013 |
| CN | 106707523 | A | * | 5/2017 |
| CN | 208140992 | U | | 11/2018 |
| CN | 109642981 | A | | 4/2019 |
| JP | 2015500571 | A | | 1/2015 |
| JP | 2017077567 | A | | 4/2017 |
| WO | 2007007388 | A1 | | 1/2007 |
| WO | 2008065336 | A1 | | 6/2008 |
| WO | 2012165389 | A1 | | 12/2012 |

OTHER PUBLICATIONS

International Search Report and Written Opinion for International Patent Application No. PCT/US2020/039463, mailed Sep. 17, 2020, 8 pages.

* cited by examiner

FUNCTIONALLY HOMOGENIZED INTENSITY DISTRIBUTION FOR ADDITIVE MANUFACTURING OR OTHER INDUSTRIAL LASER PROCESSING APPLICATIONS

RELATED APPLICATIONS

This application is a National Stage of International Application No. PCT/US2020/039463, filed Jun. 24, 2020, which claims priority benefit of U.S. Provisional Patent Application No. 62/865,902, filed Jun. 24, 2019; and U.S. Provisional Patent Application No. 62/882,442, filed Aug. 2, 2019, all of which are hereby incorporated by reference in their entireties.

TECHNICAL FIELD

The field of this disclosure relates generally to fiber lasers and fiber-coupled laser systems to deliver optical beams for use in additive manufacturing and, in particular, to improved annular laser beam profiles for powder bed fusion applications.

BACKGROUND INFORMATION

There are several types of additive manufacturing capable of processing metal workpieces. Two such categories of additive manufacturing include powder bed fusion and direct energy deposition (DED).

Powder bed fusion is a type of additive manufacturing that entails fusing powder using heat energy provided by an optical or electron beam. Currently, there are two primary types of powder bed fusion that employ optical beams.

A first type of powder bed fusion is called selective laser sintering (SLS). In SLS, a laser beam sinters powdered materials such as plastics, nylons, and ceramics. Direct metal laser sintering (DMLS) is a similar technology in which the powder is metal.

A second type of powder bed fusion is called selective laser melting (SLM). In SLM processes, a laser creates a melt pool in the powder bed. The melt pool quickly cools and solidifies to form parts.

DED includes laser engineering net shape (LENS) and electron beam additive manufacturing (EBAM). Instead of sintering or melting powder layers, feedstock is concurrently deposited and cured with heat energy.

Some attempts have been made to characterize the use of annular intensity distributions in additive manufacturing. For example, in a 2015 paper titled, "Simulation of the effect of different laser beam intensity profiles on heat distribution in selective laser melting," Wischeropp et al. describe a 2D-FEM model for qualitatively simulating the heat distribution for the melting of TiAl6V4 powder on top of a solid TiAl6V4 block. The heat distribution during the melting of a single track was simulated for three different laser beam intensity profiles at different scanning speeds and laser powers. The results touted in the paper note an increased energy efficiency and a reduced amount of vaporized material when employing the donut-shaped laser beam intensity profiles in contrast to Gaussian-shaped ones. The authors suggest donut-shaped laser beam intensity profiles provide higher build-up rates for powder bed fusion applications.

Donut-shaped laser beam intensity profiles, more generally referred to as annular intensity distributions (which include saddle shapes), have previously been attempted through excitation of a population of many modes. In other words, a multi-mode input is used to essentially flood a fiber optic segment having an annular core so as to excite many modes delivered at an output of the segment.

SUMMARY OF THE DISCLOSURE

This disclosure describes low-moded source excitation of few modes in multi-mode annular confinement core (i.e., a core having a cross-sectional profile in the shape of a ring). It is the inventors' present belief that, in contrast to a high population of modes delivered at an output, the few modes provide a higher beam quality in terms of BPP and Rayleigh range, which dramatically improve performance in terms of increased processing speed, reduced vaporized material (lower smoke and soot production), and reduced sizes of features that can be manufactured.

In some embodiments, few modes produce non-uniformity of an intensity distribution delivered at an output. Thus, this disclosure also describes embodiments including externally applied perturbation to establish a functionally homogenized annular intensity distribution with a relatively high Rayleigh range for additive manufacturing. The disclosed embodiments rely on different optical properties and mechanisms by which to homogenize the annular intensity distribution. Accordingly, the embodiments (and underlying mechanisms) are generally referred to as a phase displacement embodiment and a variable modal excitation embodiment.

More specifically, in a first embodiment, rapid vibration is applied toward a free end of an optical fiber so as to introduce mechanical oscillations (e.g., about 70 Hz) that rapidly change an interference pattern of the few modes. The change in the interference pattern rapidly moves any high intensity areas within the annular intensity distribution so as to functionally homogenize it from the perspective of the powder material. In other words, any so-called hot spots are rapidly distributed to avoid excess smoke and soot while still delivering a relatively low BPP and high Rayleigh range.

In a second embodiment, external perturbation is applied to modulate launch conditions through which few modes are excited. Accordingly, a source beam rapidly changes the population of modes that are excited. When the launch conditions are varied sufficiently rapidly, the rapid modulation has the effect (from the perspective of the powdered material) of homogenizing the annular intensity distribution delivered at the output.

Additional aspects and advantages will be apparent from the following detailed description of embodiments, which proceeds with reference to the accompanying drawings.

DETAILED DESCRIPTION OF EMBODIMENTS

Figure 1:
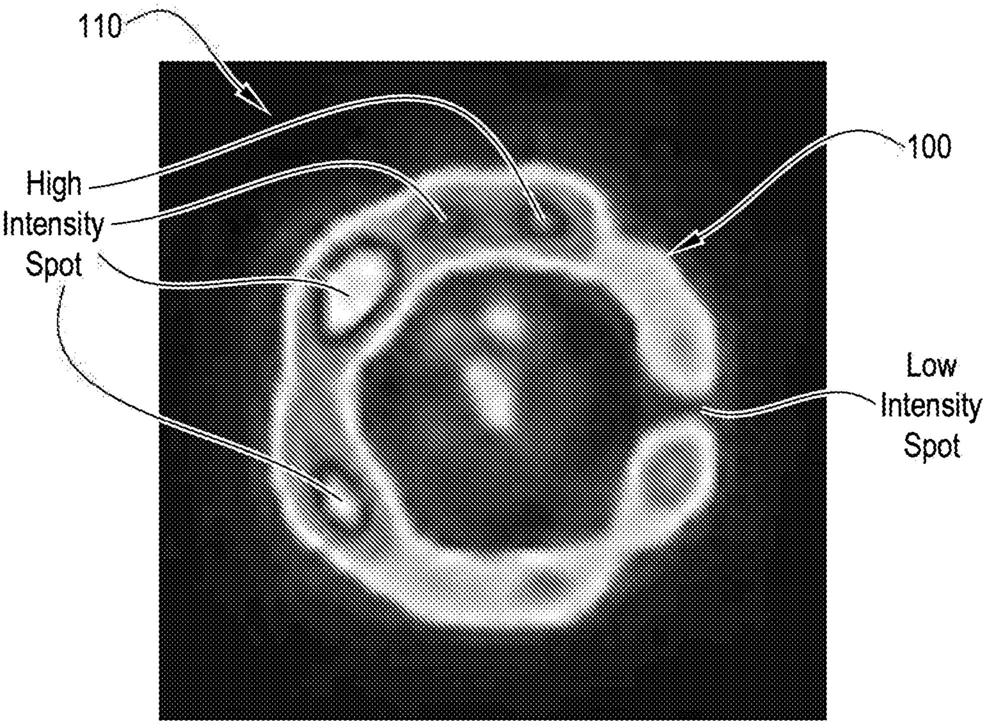
FIG. 1 is an annotated pictorial view of an annular intensity distribution delivered at an output of an optical fiber.

FIG. 1 shows an experimental result of an annular intensity distribution 100 provided at an output of a ring confinement core of an optical fiber segment (see e.g., FIGS. 2-4 for depictions of segments, described later). Annular intensity distribution 100 is generated in response to a single mode (SM) source input to the fiber segment, thereby exciting a small population of few modes in the ring confinement core. The present inventors recognized that generating annular intensity distribution 100 comprised of few modes could provide a desirable laser beam to enhance performance of additive manufacturing, notwithstanding any uneven energy distribution 110.

Not fully populating modes that would otherwise be supported in a multi-mode waveguide, however, tends to cause a lumpy, non-uniform intensity distribution at the output (also called a lobed structure). Uneven energy distribution 110 is characterized by relatively low- and high-intensity areas or so-called hot spots. Because there are few modes excited in the disclosed systems, their distribution under state(s) of static perturbation and mode excitation conditions appears to be somewhat lumpy at the output. This lumpiness may be tolerated (i.e., statically delivered) in some applications having materials and scan speeds that are not sensitive to hot-spots. This inhomogeneity can have a time dependence, which would also make the beam unstable.

For some other applications, however, uneven energy distribution 110 is functionally homogenized through externally applied perturbation that dynamically provides one or both of modulation of phase displacement and rapid variation of launch conditions for varying the population of few excited modes. Even though the resultant beam may still be instantaneously inhomogeneous at any particular time, the perturbation is sufficiently fast to allow the beam to behave in its interactions with workpieces (e.g., powder beds and the like) as if it is homogenous and stable. Thus, this disclosure describes techniques for homogenizing an inhomogeneous, non-uniform, or asymmetric intensity distribution so that it retains a relatively high quality (e.g., in terms of depth of filed and Rayleigh range) for use in industrial laser processing applications.

There are several fiber optic devices capable of generating annular intensity distribution 100. Three such embodiments are described as follows, although skilled persons will appreciate in light of this disclosure that other embodiments are also possible. Although the examples that follow are described in the context of annular intensity distributions, the disclosed techniques have widespread applicability for different types of multi-mode waveguide structures (e.g., rectangular, hexagonal, and others) having modes that are not fully populated and therefore associated with inhomogeneous, non-uniform, or asymmetric beams of various shapes (e.g., a top hat beam having hot spots).

Figure 5:
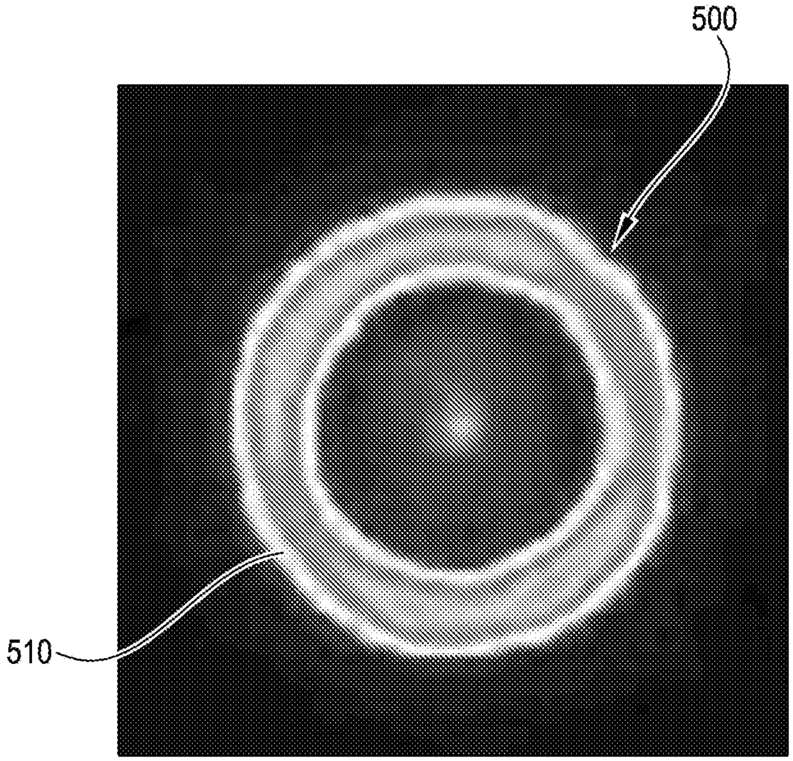
FIG. 5 is a pictorial view of a functionally homogenized annular intensity distribution delivered at an output of an optical fiber.
Figures 2, 3, 4:
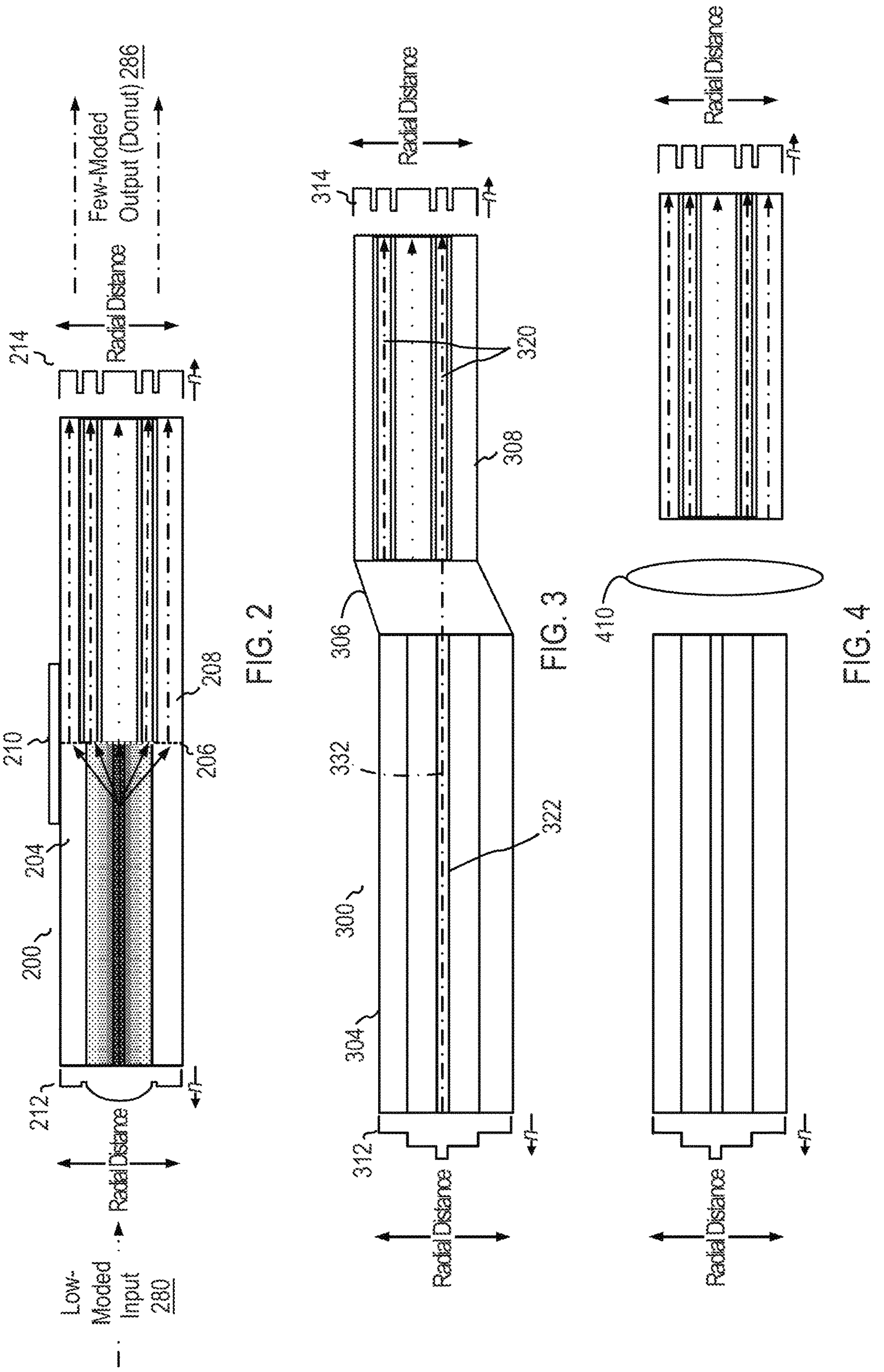
FIGS. 2-4 are cross-sectional views of an example fiber structure for delivering a beam with variable beam characteristics.
Figure 6:
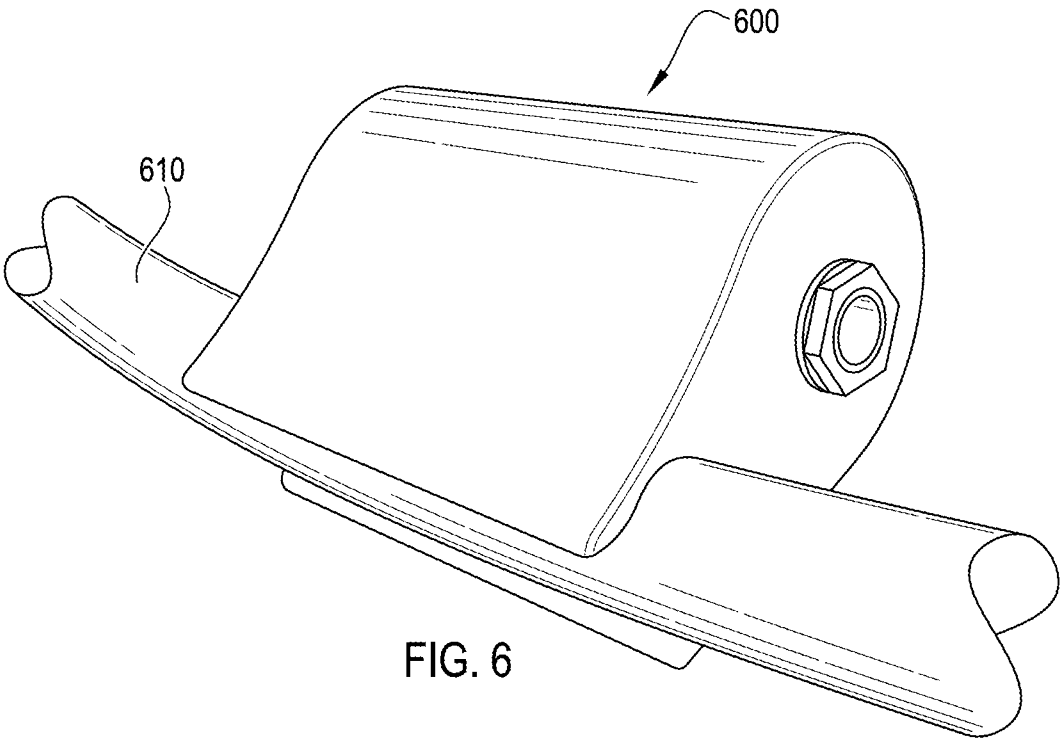
FIGS. 6 and 7 are, respectively, perspective and isometric views of an external perturbation device, in which FIG. 7 also shows in phantom lines internal components of the device.

FIG. 2 shows a first embodiment capable of generating annular intensity distribution 100 includes a variable beam characteristics (VBC) fiber 200, similar to those described in U.S. Pat. No. 10,295,845 of Kliner et al. FIGS. 7-10 of the '845 patent show experimental results for VBC fiber 200 and illustrate a beam response to perturbation of VBC fiber 200 when a perturbation assembly 210 acts on VBC fiber 200 to bend the fiber. FIGS. 4-6 of the '845 patent are simulations and FIGS. 7-10 are experimental results in which a beam from a SM 1050-nm source was launched into an input fiber (not shown) with a 40-micron core diameter. The input fiber was spliced to first length of fiber 204 having a first refractive index profile (RIP) 212. First length of fiber 204 is spliced at an optically inert junction 206 (splice, index matching glue, or the like) to a second length of fiber 208 having a second RIP 214 that is different from the first RIP.

Thus, first length of fiber 204 carries a beam that excites a population of modes in second length of fiber 208, which includes co-axially arranged confinement regions forming an outer ring, an optional inner ring, and an optional central core. By introducing transverse displacement, as shown in FIG. 6 of the '845 patent, modes in outer (or inner ring) are excited to produce annular intensity distributions at the output of second length of fiber 208. Additional details on generating annular intensity distributions are described in U.S. Pat. No. 10,663,768 of Martinsen et al.

To further enhance the resultant beam for use in additive manufacturing, the present inventors tested an SM input 280 exciting few modes 286 in second length of fiber 280, which would typically support many modes. In other words, low-moded input 280 delivered by first length of fiber 204 at junction 206 excites relatively small population of modes 286 in second length of fiber 208 acting as a waveguide for guiding modes 286. In a representative experiment, a single-mode beam was launched into an annular guiding region with an inner diameter of approximately 40 μm and an outer diameter of approximately 60 μm. Populating all the modes of the annular region would result in an $M^2$ value of about 30, whereas the measured $M^2$ was about 8 for the actual annular beam (due to its low-moded excitation). This 3.8× improvement in beam quality results in a 3.8×increase in the depth of field (Rayleigh range) for the focused beam, providing substantial processing advantages (larger process window, lower sensitivity to optical alignment).

An exact number of modes in a small population can vary based on empirical results. It is the inventors' present belief that excitation of about half (i.e., 50%) or less of the supportable modes provides desired benefits in connection with powder bed fusion. In other embodiments, the number of modes excited may comprise a range from two to ten modes, which may be about 10% or less of the possible modes that are actually guidable by the waveguide. Other percentages and ranges of excited (vis-à-vis supported) modes are also considered to fall within the scope of this disclosure. Likewise, the low number of modes of the source can be expressed in terms of the proportion of the few modes excited at the output. For instance, an SM source is suitable for exciting ten or fewer modes, and, more generally, a low-moded source (e.g., four modes) is suitable for exciting 10% or less of the supported modes. The actual percentage may vary depending on the number of modes supported in the multimode fiber spans a broad range for different fiber designs. Some designs support 10-20 modes in which case the low-moded input may excite about 80% of those modes, whereas others support more than 1000 modes and the low-moded input excites a much smaller percentage.

FIG. 3 shows a second embodiment capable of generating annular intensity distribution 100. Offset spliced fiber 300 includes a first length of fiber 304, an offset splice junction 306, and a second length of fiber 308. First length of fiber 304 includes a first RIP 312. Second length of fiber 308 includes a second RIP 314 defined by one or more annular cores. Specifically, annular core 320 is laterally offset from a central SM confinement core 322 of first length of fiber 304. Annular confinement core 320 thereby confronts central SM confinement core 322. A beam 332 propagating through central SM confinement core 322 is thereby launched directly into at least a portion of annular confinement core 320 due to offset splice junction 306.

FIG. 4 shows a third embodiment capable of generating annular intensity distribution 100. In this example, two fibers are separated by free-space optics 410 therebetween. Optics 410 are used to launch a beam into a ring confinement core.

FIG. 5 shows an example of a functionally homogenized annular intensity distribution 500, which represents how hot spots of FIG. 1 can be rapidly moved such that the average power is smoothed out over an annulus 510 (or other shapes of confinement regions). There are at least two embodiments proposed in this disclosure for achieving such homogenization.

In a first embodiment, lab experiments performed by the present inventors have demonstrated that the distribution of power shown in FIG. 1 is sensitive to motion of the fiber having the ring confinement core. Thus, the present inventors recognized that the output of fiber having a ring confinement core may be rapidly perturbed so as to produce an apparently homogeneous power distribution. At any instant, power remains unevenly distributed, but fast perturbation provides the appearance of a homogeneous beam with respect to material to which the homogenized beam in applied. In other words, from the perspective of the material, i.e., its thermal mass characteristics, a functionally homogenized beam having few modes performs essentially just as well as if the beam were actually azimuthally scrambled.

In terms of the underlying mechanism that produces the functional result, it is noted that externally applied perturbation at the output changes the phase relationship among the few modes, and it need not change a number of modes that are excited. Thus, a change in phase results in rapidly changing minima and maxima and positive and negative interference among the modes in the second length of fiber, which in turn rapidly changes the azimuthal location of the hot spots. The average intensity, therefore, appears to be homogenized when the change in phase is sufficiently rapid.

Figure 7:
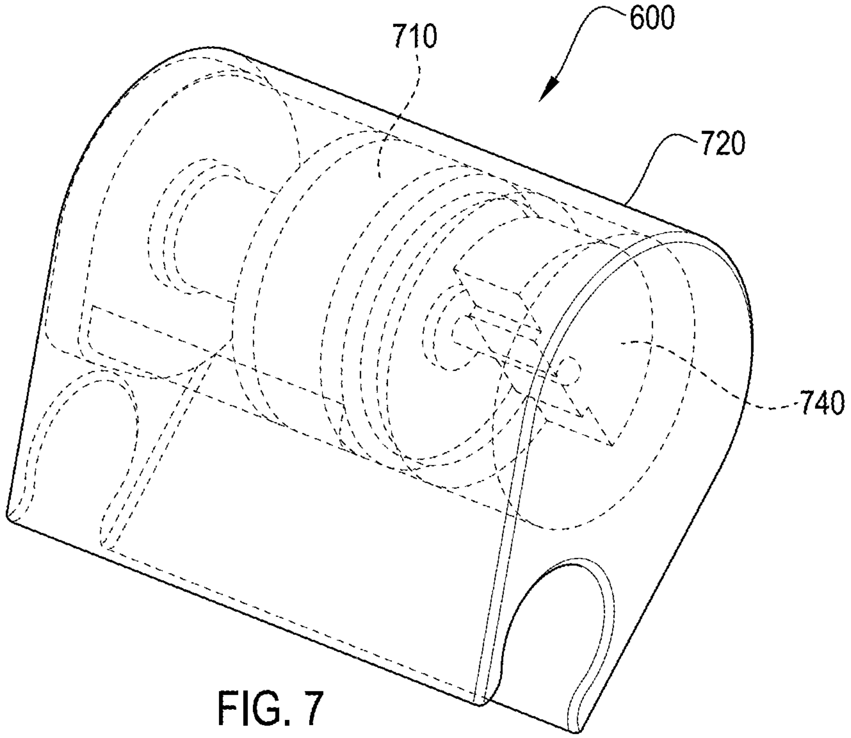

FIGS. 6 and 7 show an example of how an external perturbation device 600 applies perturbation externally, directly onto a jacketed fiber 610, within a laser system case (not shown) or near a process head of the type shown in Pub. No. US 2018/0180803 A1 of Victor et al. (see e.g., FIG. 31A) or another type of additive manufacturing system. Device 600 conforms to jacketed fiber 610 using a pair of clips secured onto an outer surface of an output fiber (i.e., second length of fiber 208 of a VBC fiber, FIG. 2) and is powered by a small power supply (not shown). In other embodiments, second length of fiber 208 is vibrated directly, in luie of or in addition to vibrating the fiber through a protective jacket or cable.

FIG. 7 shows device 600 includes a commercially available 5V DC electric vibration motor 710, housed within a 3D-printed housing 720 that clips onto the fiber conduit. It may also be secured with zip ties or other attachments such as clamps. Motor 710 spins a counterweight 740 at about 70 Hz (4,200 RPM), which produces vibrations changing the phase relationship inside fiber 610 (as described previously). Higher or lower frequencies outside of audible ranges may be used as well.

Various other types of perturbation devices are also possible. For example, many other devices could be used internal or external to the laser box: piezo, voice coil, solenoid actuators, alternating electromagnetic fields, a fan/air to vibrate the fiber, or other devices and sources of vibration. FIG. 24 of the '854 patent shows examples of different types perturbation devices for varying the population of excited modes, and these types of devices are also suitable for use in changing the phase relationship inside fiber 610. Other mechanical actuators include linear or rotary motor that drives the vibration directly or via a linkage that changes the frequency (e.g., an eccentric rotating mass), pneumatic actuators, and electro- or magnetostrictive devices. Perturbation may also be imparted by pushing or compressing the ring fiber, introducing small micro bends to the ring fiber, and including some geometry to the fiber cladding.

In a second embodiment, the present inventors recognized that rapid variations in launch conditions could also be used to generate functionally homogenized results. For example, U.S. Pat. No. 10,677,984 of Brown et al. describes techniques for generating temporally apparent intensity distributions by rapid, externally applied perturbation at a VBC fiber to excite modes in different cores. This technique could also be applied to dither between different small populations of few modes that are excited in the same core, thereby rapidly changing the hot spots for delivering a high-quality beam enhancing powder bed fusion. The dithering can vary launch conditions between two coaxial cores or within a single ring core (e.g., by moving a portion of the beam between cladding and the waveguide portion or by imparting rapid transverse displacement of a beam launched in the single ring core). In some embodiments, a static perturbation is applied to impart transverse displacement and a high-frequency dynamic supplemental perturbation is applied to rapidly vary launch conditions in a single ring core.

Finally, skilled persons will appreciate that many changes may be made to the details of the above-described embodiments without departing from the underlying principles of the invention. For example, features of the first and second embodiments for introducing externally applied perturbation are combinable into a third embodiment having both phase relationship and modal excitation homogenization. Furthermore, skilled persons will appreciate that modulation frequency and speed of variation in launch conditions are functions of the desired average intensity distribution, type of laser process, and workpiece thermal material properties such as thermal conductivity, thermal diffusivity, specific heat, melting point, or other properties. The scope of the present invention should, therefore, be determined only by the following claims.

The invention claimed is:

1. A method of generating a laser output beam having a functionally homogenized, annular intensity distribution, the method comprising:

exciting, by application of a low-moded source beam to a multi-mode annular confinement core, a population of few modes in the multi-mode confinement core such that the population exhibit an inhomogeneous intensity distribution; and providing externally applied perturbation to change phase relationship without a change in a number of modes being excited in the multi-mode annular confinement core and vibrational perturbation of launch conditions of the low-moded source beam into the multi-mode annular confinement core thereby functionally homogenizing the inhomogeneous intensity distribution to generate the laser output beam having the functionally homogenized, annular intensity distribution.

2. The method of claim 1, in which the low-moded source beam has four or fewer modes.

3. The method of claim 1, in which the low-moded source beam has a single mode.

4. The method of claim 1, in which the low-moded source beam excites 50% or less of modes supported by the multi-mode confinement core.

5. The method of claim 1, in which the low-moded source beam excites 10% or less of modes supported by the multi-mode confinement core.

6. The method of claim 1, in which the population of few modes in the multi-mode confinement core includes ten or fewer modes.

7. The method of claim 1, further comprising providing modulation of phase displacement by coupling a perturbation device to an optical fiber that includes the multi-mode confinement core.

8. The method of claim 7, in which the perturbation device comprises a voice coil in a housing that conforms to a jacket of the optical fiber.

9. The method of claim 7, in which the perturbation device comprises a rotary electric motor in a housing that conforms to a jacket of the optical fiber.

10. The method of claim 1, further comprising providing variation of launch conditions of the low-moded source beam by coupling a perturbation device to a junction of a variable beam characteristics (VBC) fiber.

11. The method of claim 1, further comprising applying the laser output beam to an additive manufacturing workpiece.

12. An apparatus for generating a laser output beam having a functionally homogenized, annular intensity distribution, the apparatus comprising:

a first length of optical fiber to guide a low-moded source beam;

a second length of optical fiber having a multi-mode confinement core configured to receive the low-moded source beam and thereby excite a population of few modes in the multi-mode confinement core such that the population exhibit an inhomogeneous intensity distribution; and a perturbation device to provide externally applied perturbation to change phase relationship without a change in a number of modes being excited in the multi-mode confinement core and vibrational perturbation of launch conditions of the low-moded source beam into the multi-mode confinement core thereby functionally homogenizing the inhomogeneous intensity distribution to generate the laser output beam having the functionally homogenized, annular intensity distribution.

13. The apparatus of claim 12, in which the first and second lengths of fiber comprise a variable beam characteristics (VBC) fiber.

14. The apparatus of claim 12, in which the first and second lengths comprise an offset spliced fiber.

15. The apparatus of claim 12, in which the first and second lengths comprise, respectively, a first fiber and a second fiber separated by free-space optics between free ends of the first and second fibers.

16. The apparatus of claim 12, in which the perturbation device comprises a voice coil coupled to the second length of fiber.

17. The apparatus of claim 12, in which the perturbation device comprises an internal geometry of the second length of fiber.

18. The apparatus of claim 12, in which the first length of fiber is a single mode fiber.

* * * * *